United States Patent
Miyamae

(10) Patent No.: US 8,410,767 B2
(45) Date of Patent: Apr. 2, 2013

(54) CONTROL CIRCUIT OF DC-DC CONVERTER APPLYING OFFSET TO COIL CURRENT, DC-DC CONVERTER APPLYING OFFSET TO COIL CURRENT AND CONTROL METHOD OF DC-DC CONVERTER

(75) Inventor: Toru Miyamae, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 742 days.

(21) Appl. No.: 12/475,982

(22) Filed: Jun. 1, 2009

(65) Prior Publication Data

US 2009/0309557 A1    Dec. 17, 2009

(30) Foreign Application Priority Data

Jun. 12, 2008  (JP) ................................. 2008-153889

(51) Int. Cl.
*G05F 1/00* (2006.01)
(52) U.S. Cl. ......... 323/284; 323/243; 323/285; 323/288
(58) Field of Classification Search .................. 323/242, 323/243, 282, 284, 285, 288
See application file for complete search history.

(56) References Cited

U.S. PATENT DOCUMENTS

| | | | |
|---|---|---|---|
| 6,366,070 B1* | 4/2002 | Cooke et al. | 323/284 |
| 2003/0231012 A1* | 12/2003 | Corva et al. | 323/285 |
| 2004/0095105 A1* | 5/2004 | Nakata | 323/280 |
| 2006/0202669 A1* | 9/2006 | Nishimori | 323/283 |
| 2006/0284607 A1* | 12/2006 | Isobe | 323/282 |
| 2007/0252567 A1* | 11/2007 | Dearn et al. | 323/282 |
| 2008/0150500 A1* | 6/2008 | Gurcan | 323/271 |
| 2008/0175029 A1* | 7/2008 | Jung et al. | 363/79 |

FOREIGN PATENT DOCUMENTS

JP    2004-173353 A    6/2004

\* cited by examiner

*Primary Examiner* — Adolf Berhane
*Assistant Examiner* — Gary Nash
(74) *Attorney, Agent, or Firm* — Fujitsu Patent Center

(57) ABSTRACT

A DC-DC converter or the like capable of generating a stable output voltage is provided. A control circuit 11 of a current mode step-down DC-DC converter 1 includes a slope compensation circuit SC and an offset circuit IF1. The slope compensation circuit SC adds an increase gradient m2 due to slope compensation to an increase gradient of a coil current waveform Vsense in a range wherein an ON period Ton of a switch SW1 exceeds ½ of an operating cycle T. An offset circuit IF1 applies an offset voltage Voffset which becomes smaller depending on the ON period Ton in excess of ½ of an operating cycle T, to a coil current waveform Vsense.

9 Claims, 10 Drawing Sheets

CIRCUIT DIAGRAM OF STEP-DOWN DC-DC CONVERTER 1 ACCORDING TO FIRST EMBODIMENT

FIG. 1 CIRCUIT DIAGRAM OF STEP-DOWN DC-DC CONVERTER 1 ACCORDING TO FIRST EMBODIMENT

FIG. 2 CIRCUIT DIAGRAM IN ONE EXAMPLE OF OFFSET CIRCUIT IF1

CHARACTERISTIC DIAGRAM OF OFFSET CURRENT Ioffset
IN ONE EXAMPLE OF STEP-DOWN DC-DC CONVERTER 1

FIG. 5 CIRCUIT DIAGRAM OF STEP-UP DC-DC CONVERTER 1a ACCORDING TO SECOND EMBODIMENT

CHARACTERISTIC DIAGRAM OF OFFSET CURRENT Ioffset 2
IN ONE EXAMPLE OF STEP-UP DC-DC CONVERTER 1a FIG. 8 CIRCUIT DIAGRAM OF STEP-UP/STEP-DOWN DC-DC CONVERTER 1b ACCORDING TO THIRD EMBODIMENT CHARACTERISTICS DIAGRAM OF OFFSET CURRENT Ioffset 3 ACCORDING TO ONE EMBODIMENT OF STEP-UP/STEP-DOWN DC-DC CONVERTER 1b

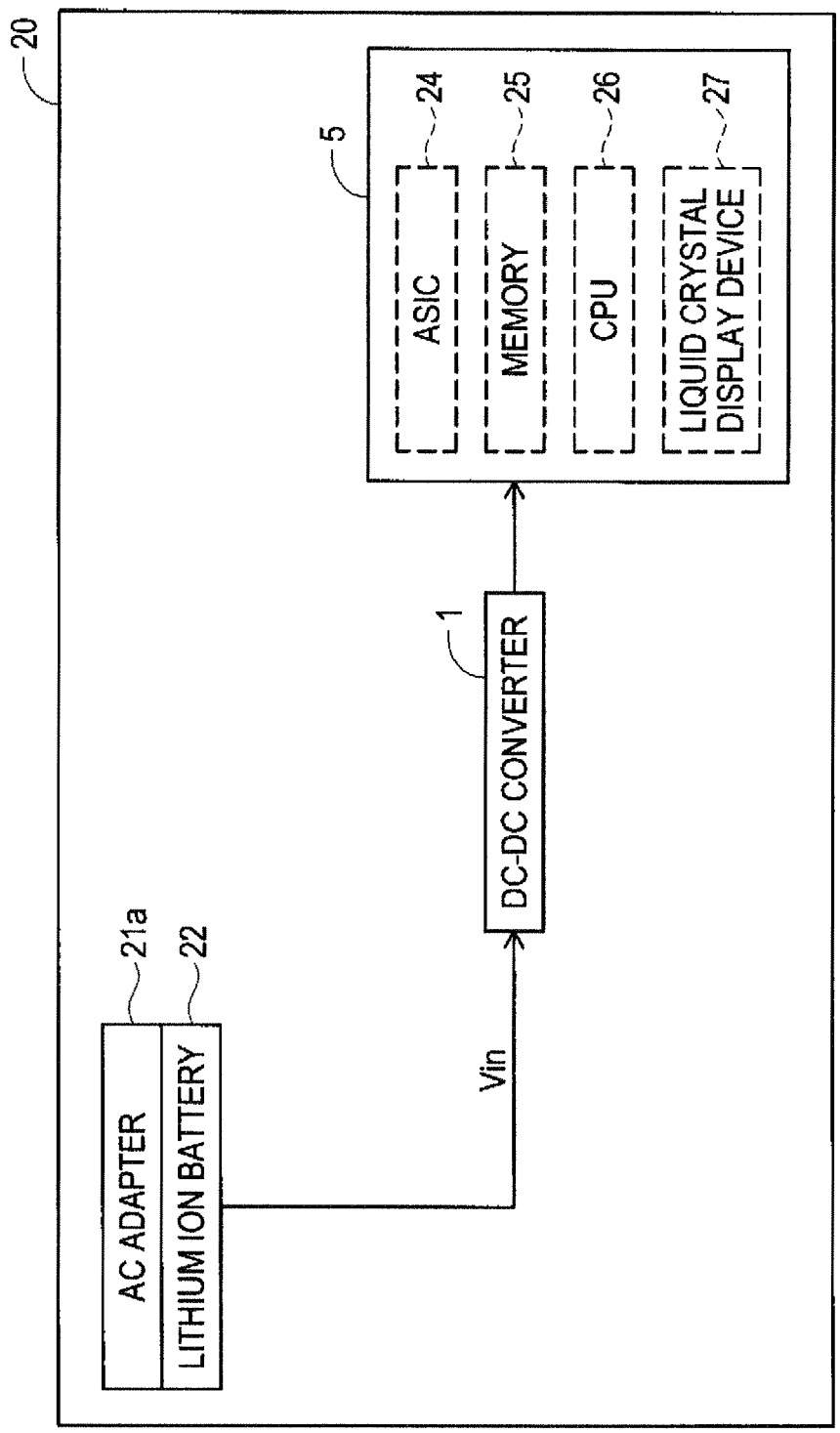

CONTROL CIRCUIT OF DC-DC CONVERTER APPLYING OFFSET TO COIL CURRENT, DC-DC CONVERTER APPLYING OFFSET TO COIL CURRENT AND CONTROL METHOD OF DC-DC CONVERTER

CROSS-REFERENCE TO RELATED APPLICATIONS

This application is based upon and claims the benefit of priority of the prior Japanese Patent Application No. 2008-153889, filed on Jun. 12, 2008, the entire contents of which are incorporated herein by reference.

FIELD

The embodiments discussed herein are directed to a control circuit of a DC-DC converter, a DC-DC converter and a control method of a DC-DC converter. More particularly, the embodiments are directed to a DC-DC converter or the like capable of generating a stable output voltage.

BACKGROUND

In conventional current mode step-down DC-DC converters, on-duty ratio is determined by comparing a coil current waveform obtained by detecting a coil current and converting this current to voltage with an output signal from a differential amplifier. This on-duty ratio is a ratio of an ON period of a main switching element within an operating cycle of the DC-DC converter. In the case of such control, in an input/output relationship wherein the on-duty ratio is 50% or higher, slope compensation for preventing sub-harmonic oscillations is generally applied to the coil current waveform.

Related technology is disclosed in the Japanese Laid-open Patent Publication No. 2004-173353.

As the coil current waveform is modulated by slope compensation in case where an input voltage is changed in an input/output relationship wherein the on-duty ratio is 50% or higher, the value of the output signal from the differential amplifier changes. As the output signal from the differential amplifier changes, the DC-DC converter controls the output voltage based on the output signal from the differential amplifier. This destabilizes the output voltage.

SUMMARY

According to an aspect of the invention, a control circuit of a DC-DC converter includes a differential amplifier configured to output a differential output in accordance with an output voltage to be outputted through a coil and a reference voltage, a first control circuit configured to compare the differential output with a coil current flowing to the coil and to determine an ON period in an operating cycle of a main switching element which is included in a current path of the coil current, a slope compensation circuit configured to add an increase gradient due to slope compensation to an increase gradient of the coil current in a range wherein the ON period exceeds a certain period of time, and an offset circuit configured to apply an offset to the coil current, the offset becoming smaller depending on the ON period in excess of the certain period of time.

According to another aspect of the invention, a DC-DC converter includes a differential amplifier configured to output a differential output in accordance with an output voltage to be outputted through a coil and a reference voltage, a first control circuit configured to compare the differential output with a coil current flowing to the coil and to determine an ON period in an operating cycle of a main switching element which is included in a current path of the coil current, a slope compensation circuit configured to add an increase gradient due to slope compensation to an increase gradient of a coil current waveform in a range wherein the ON period exceeds a certain period of time and an offset circuit configured to apply an offset to the coil current waveform, with the offset becoming smaller depending on the ON period in excess of the certain period of time.

According to another aspect of the invention, a control method of a DC-DC converter includes outputting a differential output in accordance with an output voltage to be outputted through a coil and a reference voltage and comparing the differential output with a coil current flowing to the coil and determining an ON period in an operating cycle of a main switching element which is included in a current path of the coil current, adding an increase gradient due to slope compensation to an increase gradient of a coil current waveform in a range wherein the ON period exceeds a certain period of time, and applying an offset to the coil current waveform, with the offset becoming smaller depending on the ON period in excess of the certain period of time.

Once the ON period exceeds a predetermined period as a result of the change in the input voltage, an increase gradient due to slope compensation is added to an increase gradient of the coil current waveform in the slope compensation circuit. Thus, the level at which the differential output of the differential amplifier settles becomes larger by the amount of the added increase gradient due to slope compensation, in a range wherein the ON period exceeds a predetermined period. The increase amount in the coil current waveform due to slope compensation becomes larger as the ON period in excess of the predetermined period becomes larger. The level at which the differential output of the differential amplifier settles also becomes larger as the increase amount of the current waveform becomes larger. Specifically, a change is made so that when the ON period exceeds the predetermined period, the value of the differential output of the differential amplifier becomes larger in accordance with the ON period in excess of the predetermined period. As the DC-DC converter controls the output voltage using the differential voltage as reference, the level of the differential output may change, causing the output voltage to be unstable.

However, according to one aspect of the control circuit, offset is applied to the coil current waveform. The value of this offset becomes lower as the ON period in excess of the predetermined period becomes larger. Thus, the influence of coil current amplification due to slope compensation is offset due to a reduction in the offset, in a range wherein the ON period exceeds the predetermined period. Accordingly, as increases in the peak value of the coil current waveform are reduced as the current amplification amount of the coil current becomes larger, the change in the value of the differential output of the differential amplifier becomes smaller. As a result, fluctuations in the value of the differential output can be suppressed, allowing for stable output voltage.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 is a characteristic diagram of an offset current Ioffset2 in one example of the step-up DC-DC converter 1a;

FIG. 7 is a waveform diagram in one example of the step-up DC-DC converter 1a;

FIG. 10 illustrates a portable device system 20 according to one example of the embodiments.

DESCRIPTION OF EMBODIMENTS

Figure 1:
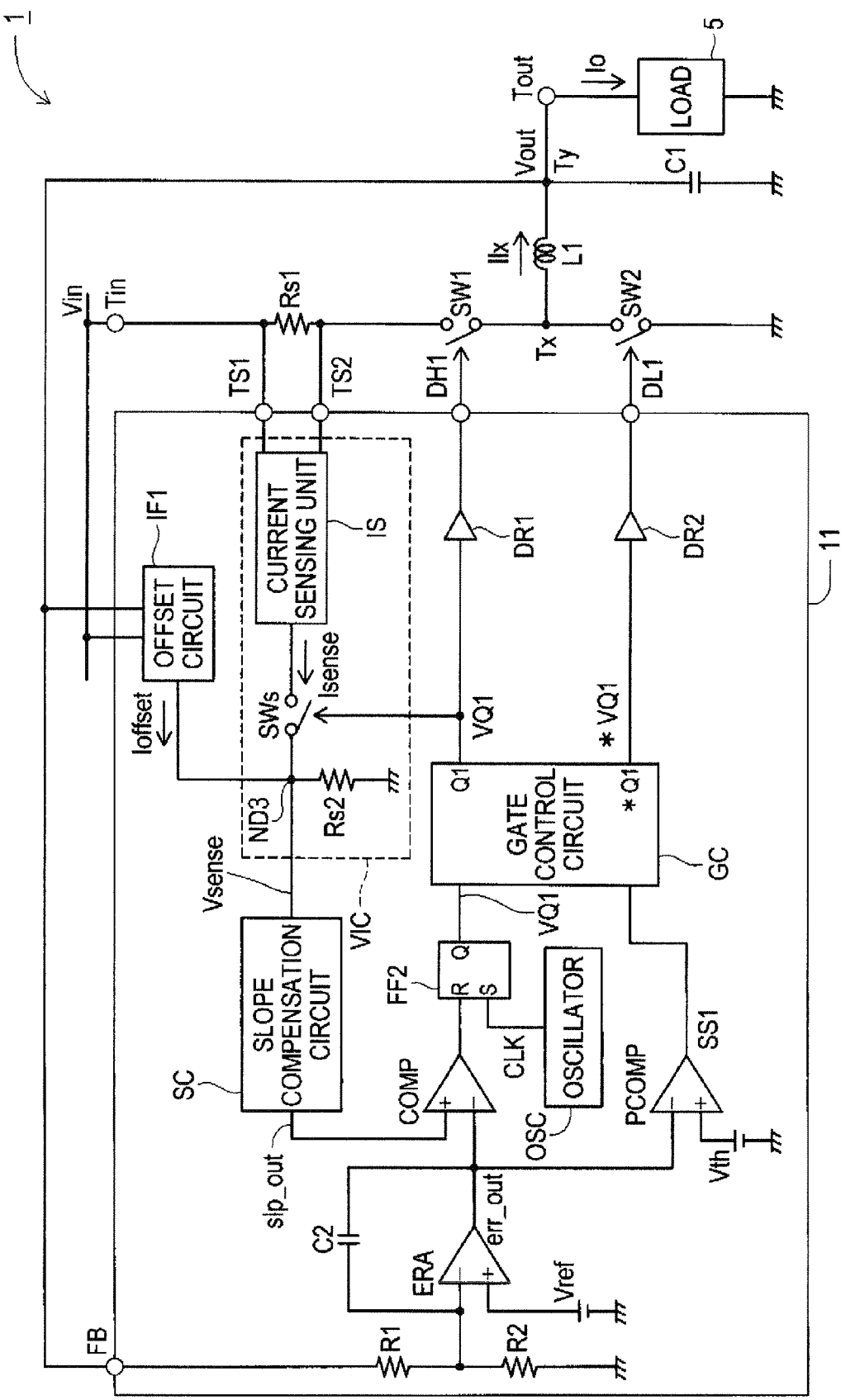
FIG. 1 is a circuit diagram of a step-down DC-DC converter 1 according to a first embodiment.

A circuit diagram of a current mode step-down DC-DC converter 1 according to a first embodiment is illustrated in FIG. 1. This step-down DC-DC converter 1 has a choke coil L1, switches SW1 and SW2, an output capacitor C1, a sensing resistor Rs1 and a control circuit 11. At one end of the switch SW1 is connected an input terminal Tin through the sensing resistor Rs1. Both terminals of the sensing resistor Rs1 are connected to terminals TS1 and TS2 of the control circuit 11. An input terminal Tin receives an input voltage Vin. The other terminal of the switch SW1 is connected to terminal Tx of the choke coil L1 and one terminal of the switch SW2. The other terminal of the switch SW2 is connected to a reference potential. The control terminals of the switches SW1 and SW2 are respectively connected to the output terminals DH1 and DL1 of the control circuit 11.

Terminal Ty of the choke coil L1 is connected to an output terminal Tout. An output voltage Vout which is obtained as a result of stepping-down the input voltage Vin is outputted from the output terminal Tout. The output capacitor C1 is connected between the output terminal Tout and the reference potential for accumulating power to be supplied through the choke coil L1. The output terminal Tout is connected to the input terminal FB of the control circuit 11 and to load 5. An output current Io is supplied to the load 5.

The configuration of the control circuit 11 will now be described. The control circuit 11 has a current-to-voltage conversion unit VIC, an offset circuit IF1, a slope compensation circuit SC, a differential amplifier ERA, a gate control circuit GC, an oscillator OSC, comparators COMP and PCOMP, a flip-flop FF2, resistive elements R1 and R2 and drivers DR1 and DR2.

The current-to-voltage conversion unit VIC has a current sensing unit IS, a resistive element Rs2 and a switch SWs. Both terminals of the sensing resistance Rs1 are connected to the current sensing unit IS through the terminals TS1 and TS2 of the control circuit 11. The output terminal of the current sensing unit IS is connected to a node ND3 through the switch SWs. A sensing current Isense which is obtained as a result of decreasing the coil current Ilx by a predetermined decrease ratio is outputted from the current sensing unit IS. The node ND3 is connected to a reference potential through the resistive element Rs1. The node ND3 outputs a coil current waveform Vsense to the slope compensation circuit SC.

Here, the resistance value of the current-to-voltage conversion unit VIC is defined as resistance Rsense. Resistance Rsense represents the resistance when the coil current Ilx is converted to the coil current waveform Vsense. This resistance has a value which is obtained as a result of decreasing the resistance value of the resistive element Rs2 by the decrease ratio in the current sensing unit IS. For instance, if the resistance value of the resistive element Rs2 is 1 (kΩ) and the decrease ratio is 1/1000, the resistance Rsense is 1 (Ω).

The input terminal FB is connected to one terminal of the resistive element R1 which is connected to the reference potential through the resistive element R2. A connection node between the resistive elements R1 and R2 is connected to the inverse input terminal of the differential amplifier ERA. A reference voltage Vref is applied to the non-inverse input terminal of the differential amplifier ERA. An output signal err_out is outputted from the differential amplifier ERA. A capacitor C2 for oscillation prevention is provided between the output terminal and the inverse input terminal of the differential amplifier ERA. A current waveform slp_out outputted from the slope compensation circuit SC is inputted to the non-inverse input terminal of the comparator COMP. The output signal err_out is inputted to the inverse input terminal of the comparator COMP. A clock signal CLK is outputted from the oscillator OSC. An output terminal of the comparator COMP is connected to the R terminal of the flip-flop FF2 and the output terminal of the oscillator OSC is connected to the S terminal of this flip-flop FF2. A threshold value voltage Vth is inputted to the non-inverse input terminal of the comparator PCOMP and an output signal err_out is inputted to the inverse input terminal of the comparator PCOMP, while a signal SS1 is outputted from the output terminal thereof. The output terminal of the flip-flop FF2 and the output terminal of the comparator PCOMP are connected to the input terminal of the gate control circuit GC.

The output terminal Q1 of the gate control circuit GC is connected to the output terminal DH1 through the driver DR1 and the control terminal of the switch SWs. The output terminal *Q1 is connected to the output terminal DL1 through the driver DR2. Control signals VQ1 and *VQ1 are respectively outputted from the output terminals Q1 and *Q1. The gate control circuit GC carries out a masking operation of the control signal VQ1 in a period when the signal SS1 is at a high level.

Figure 2:
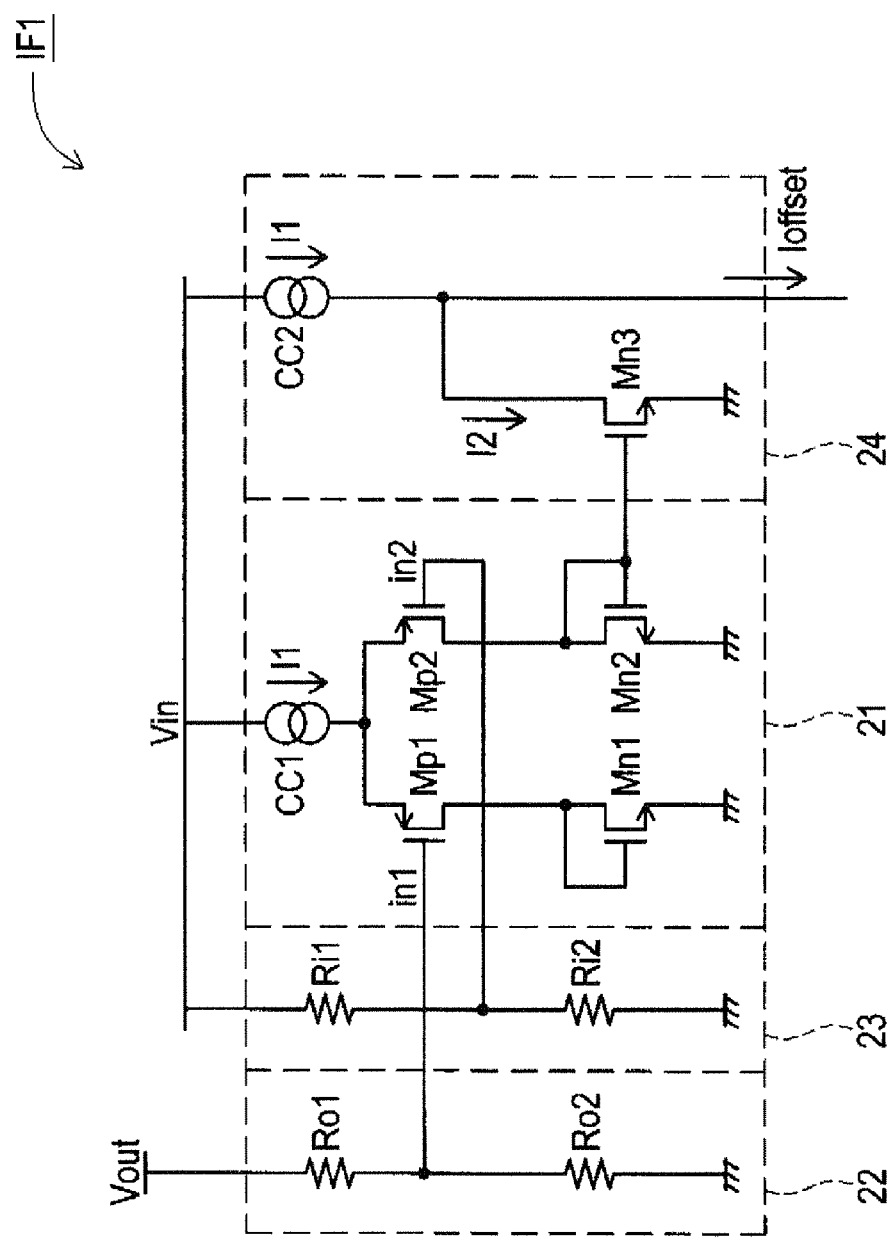
FIG. 2 is a circuit diagram in one example of an offset circuit IF1.

FIG. 2 illustrates a circuit diagram of the offset circuit IF1. The offset circuit IF1 has a differential amplification circuit 21, divider circuits 22 and 23 and a subtraction unit 24. The divider circuit 22 has resistive elements Ro1 and Ro2 which are connected in series between the output voltage Vout and the reference potential. The divider circuit 23 has resistive elements Ri1 and Ri2 which are connected in series between the input voltage Vin and the reference potential. The source terminals of transistors Mp1 and Mp2 of the differential amplification circuit 21 are connected in common to the output terminal of a constant current source CC1. A constant current I1 is supplied from the constant current source CC1. An input voltage in1 is inputted from the divider circuit 22 to the gate terminal of the transistor Mp1. An input voltage in2 is inputted from the divider circuit 23 to the gate terminal of the transistor Mp2.

A source terminal of the transistor Mn1 is connected to the reference potential and a drain terminal thereof is connected to the drain terminal of the transistor Mp1 and the gate terminal of the transistor Mn1. The source terminal of the transistor Mn2 is connected to the reference potential. The drain terminal of the transistor Mn2 is connected to the drain terminal of the transistor Mp2 and the gate terminals of the transistors Mn1 and Mn3. The source terminal of the transistor Mn3 in the subtraction unit 24 is connected to the reference potential, and the drain terminal thereof is connected to the output terminal of the constant current source CC2.

A current I2 flows to the transistor Mn3. A constant current I1 is supplied from the constant current source CC2. The difference between the constant current I1 and the current I2 represents the offset current Ioffset. The voltage division ratio of the voltage divider circuits 22 and 23 is determined conveniently so that when the value of the input voltage Vin is equal to the output voltage Vout (on-duty ratio is 100%), the constant current I1 flows entirely to the transistor Mp2 side, and when the value of the input voltage Vin is twice the output voltage Vout (on-duty ratio is 50%), the constant current I1 flows entirely to the transistor Mp1 side.

The operation of the step-down DC-DC converter 1 will now be described. An output signal err_out is outputted from the differential amplifier ERA. In the comparator COMP, an output signal Vc is outputted based on the comparison result between the output signal err_out and the current waveform slp_out. The control signal VQ1 is outputted from the flip-flop FF2 to the gate control circuit GC.

As the output signal err_out becomes larger than the threshold voltage Vth in a heavy load state, the comparator PCOMP outputs a low level signal SS1. Also, as the output signal err_out becomes smaller than the threshold voltage Vth in a light load state, the comparator PCOMP outputs a high level signal SS1. The gate control circuit GC outputs a control signal VQ1 and *VQ1 which are complimentary to each other, while the signal SS1 is at a low level, placing the step-down DC-DC converter 1 in an operating state. Also, the gate control circuit GC carries out a masking operation of the control signal VQ1 while the signal SS1 is at a high level, placing the step-down DC-DC converter 1 in a non-operating state.

Figure 3:
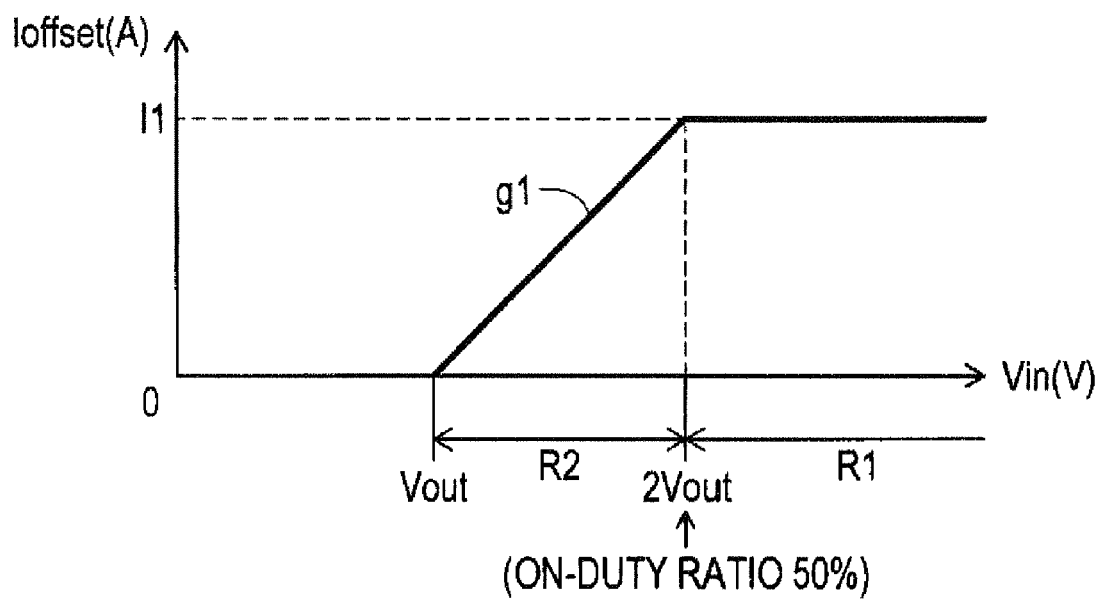
FIG. 3 is a characteristic diagram illustrating an offset current Ioffset in one example of the step-down DC-DC converter 1.

Next, the operation of the offset circuit IF1 will be described. The offset circuit IF1 serves to output an offset current Ioffset in accordance with the on-duty ratio. FIG. 3 illustrates the correlation between the input voltage Vin and the offset current Ioffset in the step-down DC-DC converter. In the range Vin>2Vout (region R1 in FIG. 3), the on-duty ratio is smaller than 50%. In the range Vout<Vin<2Vout (region R2 in FIG. 3), the on-duty ratio is larger than 50%. When Vin=Vout, the on-duty ratio is 100%. In the region R1, the value of the offset current Ioffset is equal to the constant current I1. The value of the offset current Ioffset in region R2 is equal to the constant current I1 when Vin=2Vout, and is equal to 0 (A) when Vin=Vout, in which meantime the offset current Ioffset is linear.

Here, the offset current Ioffset is expressed in the following formula (1).

$$I\text{offset} = I1 - I2 = (V\text{con}/Rs2) - \{m2 \times (V\text{out}/V\text{in} - 0.5) \times T\}/Rs2 \quad \text{(formula (1))}$$

Here, I1 represents the constant current, I2 represents the current that flows through the transistor Mn3 (FIG. 2), Vcon represents the maximum offset voltage, m2 represents the increase gradient due to slope compensation and T represents an operating cycle. Here, the increase gradient m2 due to slope compensation is expressed in the following formula (2):

$$m2 = V\text{out} \times R\text{sense}/2L \quad \text{(formula (2))}$$

Here, L represents an inductance value of the choke coil L1 and Rsense represents the resistance value of the current-to-voltage conversion unit VIC. The maximum offset voltage Vcon is equal to the value of the offset voltage Voffset when the on-duty ratio 50% or lower and becomes a constant value as expressed by the following formula (3).

$$V\text{con} = m2 \times 0.5 \times T = T \times V\text{out} \times R\text{sense}/4L \quad \text{(formula (3))}$$

The offset voltage Voffset is obtained by converting the offset current Ioffset which is outputted from the offset circuit IF1 into voltage in the resistive element Rs2. This is expressed in the following formula (4).

$$V\text{offset} = I\text{offset} \times Rs2 = V\text{con} - m2 \times (V\text{out}/V\text{in} - 0.5) \times T \quad \text{(formula (4))}$$

The operation in the offset circuit IF1 for realizing formula (1) will now be described using FIG. 2 and FIG. 3. When the on-duty ratio is smaller than 50%, the range of region R1 as illustrated in FIG. 3 applies. The region R1 is placed in a state wherein current does not flow to the transistor Mp2 side, by making the input voltage in2 sufficiently higher than the input voltage in1. When the current I2=0, the constant current I1 is outputted as is as offset current Ioffset. As a result, the offset voltage Voffset when the on-duty ratio is smaller than 50% is equal to a maximum offset voltage Vcon (=I1×Rs2) which is a constant value.

Alternatively, when the on-duty ratio is larger than 50%, the range of the region R2 as illustrated in FIG. 3 applies. As the input voltage in1 becomes smaller in region R2, a state is obtained wherein current flows to the transistor Mp2. Current obtained by subtracting current I2 from the constant current I1 is outputted as the offset current Ioffset. When the on-duty ratio is 100% (input voltage VIN=output voltage Vout), the current will flow entirely to the transistor Mp2 side. As current I2=constant current I1, the offset current Ioffset will become 0. Thus, the offset current Ioffset is equal to the constant current I1 when the on-duty ratio is smaller than 50%. The offset current Ioffset decreases linearly from the constant current I1 by gradient g1 as the on-duty ratio becomes larger than 50%.

Next, the method for determining the current waveform slp_out will be described using the waveform diagram when the on-duty ratio is 50% or smaller as illustrated at (A) in FIG. 4, and the waveform diagram when the on-duty ratio is 50% or higher as illustrated at (B) in FIG. 4. The current waveform slp_out is determined by applying the voltage amplification amount due to slope compensation in the slope compensation circuit SC and the offset voltage Voffset in the offset circuit IF1 to the coil current waveform Vsense.

First, the method for determining the coil current waveform Vsense will be described. The switch SW1 is in an ON state during an ON period Ton when the control signal VQ is at a high level. The coil current Ilx when the switch SW1 is in an ON state is detected by the current sensing unit IS, and a sensing current Isense which is obtained by decreasing such coil current by a predetermined decrease ratio (for instance, 1/1000) is outputted. The coil current waveform Vsense will thus be obtained by converting the sense current Isense to voltage in the resistive element Rs2.

In the current mode DC-DC converter, the increase gradient Im1 of the coil current Ilx during the ON period Ton is expressed by Im1=(Vin−Vout)/L. Thus, the increase gradient m1 of the coil current waveform Vsense is expressed by the following formula (5).

$$m1 = Rsense \times (Vin - Vout)/L \quad \text{(formula (5))}$$

It can be understood from formula (5) that the increase gradient m1 becomes smaller as the on-duty ratio becomes larger (specifically, as the output voltage Vout becomes larger). As the influence of the increase in the on-duty ratio and the influence of the decrease in the increase gradient m1 offset each other, the peak value of the coil current waveform Vsense is equal to a constant value Vpc even if the on-duty ratio changes, as illustrated at (A) and (B) in FIG. 4.

Next, the operation of the slope compensation circuit SC will be explained. When the on-duty ratio is 50% or smaller ((A) in FIG. 4), slope compensation is not carried out in the slope compensation circuit SC. This is because sub-harmonic oscillation does not occur when the on-duty ratio is 50% or smaller.

Figure 4:
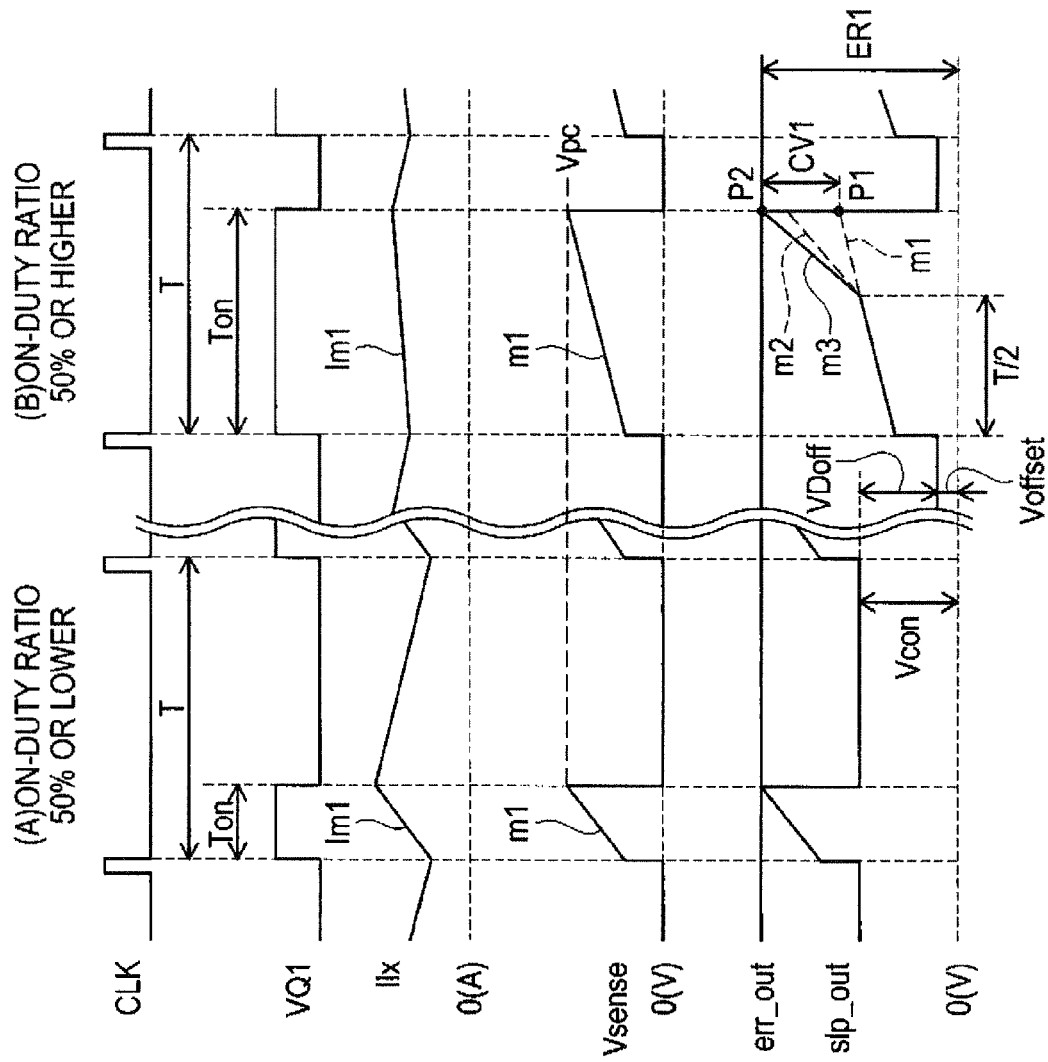
FIG. 4 is a waveform diagram in one example of the step-down DC-DC converter 1.

Alternatively, when the on-duty ratio is 50% or higher ((B) in FIG. 4), slope compensation is carried out in the slope compensation circuit SC to prevent sub-harmonic oscillations. More specifically, as illustrated in FIG. 4(B), increase gradient m3 is obtained by adding increase gradient m2 (formula (2)) to increase gradient m1 of the coil current waveform Vsense, in a range wherein the ON period Ton exceeds ½ of the operating cycle T. The peak value P2 of the current waveform slp_out in the case slope compensation is carried out is larger as compared to the peak value P1 of the current waveform slp_out in the case no slope compensation is carried out, by the amount of the compensation value CV1. Here, the compensation value CV1 is determined using the following formula (6).

$$CV1 = m2 \times (Vout/Vin \times 0.5) \times T \quad \text{(formula (6))}$$

It can be understood from formula (6) that the compensation value CV1 increases linearly depending on the ON period Ton in excess of ½ of the operating cycle T. As slope compensation may be carried out following a general method, further detailed description thereof is hereby omitted.

The operation of the offset circuit IF1 will now be described. When the on-duty ratio is 50% or smaller, the range of the area R1 in FIG. 3 applies, meaning that the offset current Ioffset is equal to the constant current I1. As illustrated in at (A) in FIG. 4, the constant maximum offset voltage Vcon is applied to the current waveform slp_out.

Alternatively, when the on-duty ratio is 50% or higher, the range of the region R2 in FIG. 3 applies. Accordingly, as illustrated at (B) in FIG. 4, an offset voltage Voffset is applied to the current waveform slp_out. This offset voltage Voffset is obtained by subtracting a [decrease amount VDoff in accordance with the ON period Ton in excess of ½ of the operating cycle T] from [the maximum offset voltage Vcon]. The decrease amount VDoff is expressed as illustrated in the following formula (7) using formula (4).

$$VDoff = Vcon - Voffset = m2 \times (Vout/Vin - 0.5) \times T \quad \text{(formula (7))}$$

As was described earlier, when the on-duty ratio is 50% or smaller, the constant maximum offset voltage Vcon is applied to the coil current waveform Vsense. When the on-duty ratio is 50% or higher, control is carried out by the offset circuit IF1 so that the offset voltage Voffset is reduced by the decrease amount VDoff (formula (7)) in accordance with an increase in the peak value of the coil current waveform Vsense by the compensation value CV1 (formula (6)) in the slope compensation circuit SC. It can be understood from formula (6) and formula (7) that since the compensation value CV1 and the decrease amount VDoff are equal, the influence of the compensation value CV1 is offset by the decrease amount VDoff in case the on-duty ratio exceeds 50%. The settling point of the output signal err_out is maintained at a constant value ER1, irrespective of the on-duty ratio value.

The effects of the step-down DC-DC converter 1 according to the first embodiment will now be described. If offset by the offset circuit IF1 is not applied, the level at which the output signal err_out settles changes as the peak value of the current waveform slp_out is modulated by the slope compensation in an input/output relationship wherein the on-duty ratio is 50% or higher. Thus, when the level of the output signal err-out_is changed so that the on-duty ratio is around 50%, fluctuations may occur in the output voltage Vout in accordance with the change in the level of the output signal err_out. This may create a problem. As a result of the change in the level of the output signal err_out, a change also occurs in the load level with a threshold value at which the comparator PCOMP switches the voltage DC-DC converter 1 between an operating state and a non-operating state.

However, according to one aspect of the step-down DC-DC converter 1 according to the first embodiment, the value of the offset voltage Voffset is controlled so as to adjust the change in the coil current waveform due to slope compensation. This makes it possible to maintain the level of the output signal err_out at a constant value ER1 irrespective of the on-duty ratio. As a result, fluctuations in the output voltage Vout can be prevented from occurring. Also, changes in the load level with a value at which the step-down DC-DC converter 1 is switched between the operating state and non-operating state can be prevented from occurring.

Figure 5:
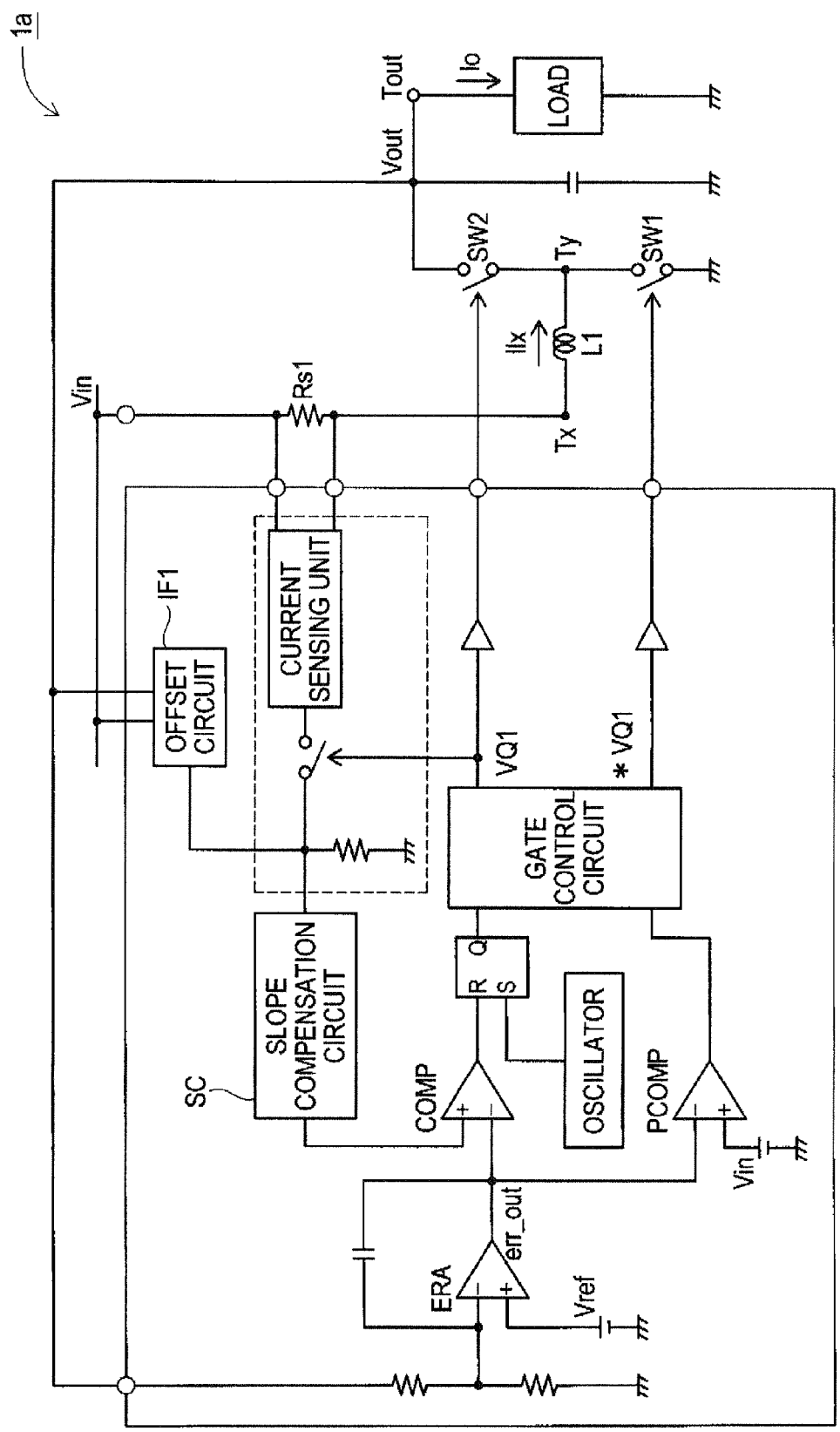
FIG. 5 is a circuit diagram of a step-up DC-DC converter 1a according to a second embodiment.

A circuit configuration of a step-up DC-DC converter 1a according to a second embodiment is illustrated in FIG. 5. An input voltage Vin is inputted to a terminal Tx of the choke coil L1 through a sensing resistance Rs1. One terminal of a switch SW1 is connected to a reference potential, while the other terminal thereof is connected to a terminal Ty of the choke coil L1. One terminal of a switch SW2 is connected to terminal Ty of the choke coil L1, while the other terminal thereof is connected to an output terminal Tout. As the rest of the configuration is the same as that of the step-down DC-DC converter 1 according to the first embodiment, further detailed description thereof is hereby omitted.

Figure 6:
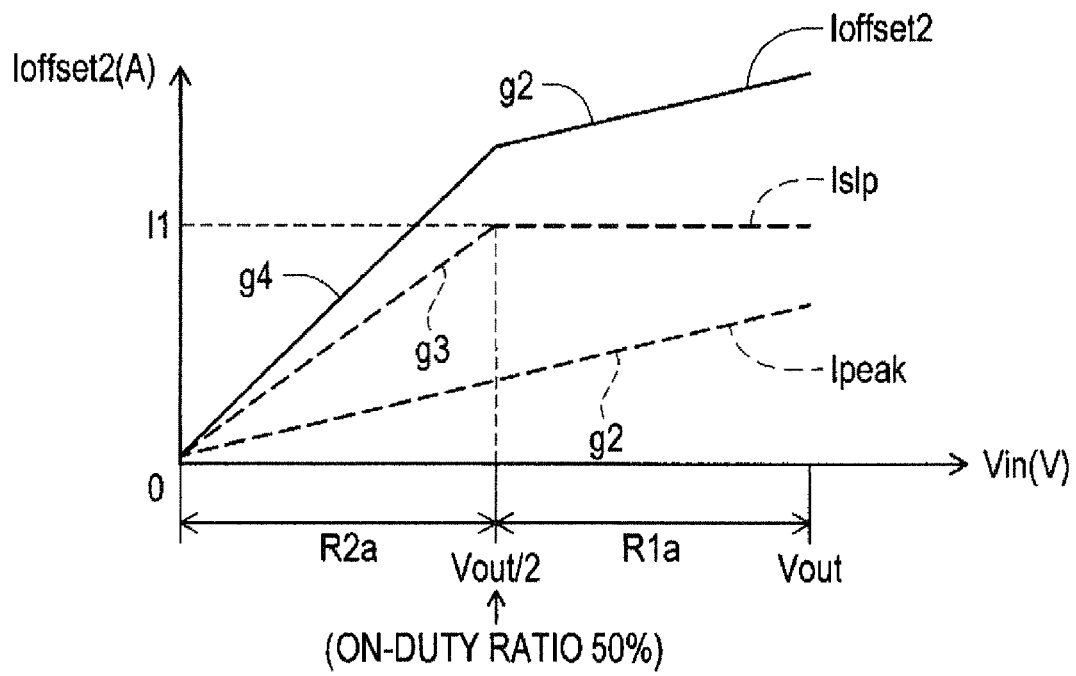

The operation in this converter will now be described. First the operation of the offset circuit IF1 will be described. FIG. 6 is a diagram illustrating the correlation between the input voltage Vin and the offset current Ioffset2 in the step-up DC-DC converter. When Vin>Vout/2 (region R1a in FIG. 6), the on-duty ratio becomes smaller than 50%, while when Vin<Vout/2 (region R2a in FIG. 6), the on-duty ratio becomes larger than 50%. When Vin=0 (V), the on-duty ratio becomes 100%.

Here, the offset current Ioffset2 is expressed in the following formula (8).

$$Ioffset2 = Ipeak + Islp \quad \text{(formula (8))}$$

The offset current Ioffset2 is the sum of the offset current Ipeak and the offset current Islp. Here, the offset current Ipeak (dotted line in FIG. 6) serves to moderate the influence of the fluctuations in the peak value of the coil current Ilx. In principle, the step-up DC-DC converter makes changes so that the peak value Ip of the coil current Ilx becomes higher as the on-duty ratio becomes larger. The influence of the fluctuations in the peak value is moderated by the offset current Ipeak.

The offset current Islp (dotted line in FIG. 6) serves to moderate the influence of the fluctuation in the coil current waveform Vsense due to slope compensation. The fact that slope compensation is carried out when the on-duty ratio is larger than 50% is similar with the step-down DC-DC converter 1 as described in the first embodiment. The offset current Islp becomes a constant value in a range wherein the on-duty ratio is smaller than 50%, or otherwise, decreases linearly in a range wherein the on-duty ratio is larger than 50%, in accordance with the amount of the on-duty ratio exceeding 50%.

Here, the offset current Ipeak is expressed in the following formula (9).

$$Ipeak = \Delta Ipeak \times Rsense/Rs2 \quad \text{(formula (9))}$$

Here, the peak difference ΔIpeak is the change amount of the peak current when the input voltage changes from the input voltage Vin1 to Vin2. The peak difference ΔIpeak at the input voltage Vin1 and the input voltage Vin2 is expressed in the following formula (10).

$$\Delta Ipeak = Ipeak1 - Ipeak2 \quad \text{(formula (10))}$$

Here, the peak value Ipeak1 represents the peak value of the coil current Ilx at the input current Vin1, and is expressed in the following formula (11).

$$Ipeak1 = Io \times Vout/Vin1 + Vin1 \times T(Vout - Vin1)/(2L \times Vout) \quad \text{(formula (11))}$$

Similarly, the peak value Ipeak2 is the peak value of the coil current Ilx at the input voltage Vin2 and is expressed in the following formula (12).

$$Ipeak2 = Io \times Vout/Vin2 + Vin2 \times T(Vout - Vin2)/(2L \times Vout) \quad \text{(formula (12))}$$

The offset current Islp is expressed by the following formula (13).

$$Islp = (T \times Vout \times Rsense/4L)/Rs2 - m2 \times \{0.5 - (Vin/Vout)\} \times T/Rs2 \quad \text{(formula (13))}$$

The specific circuitry of the offset circuit IF1 for realizing formula (8) is the same as that in the first embodiment, and therefore further detailed description thereof is hereby omitted.

Figure 7:
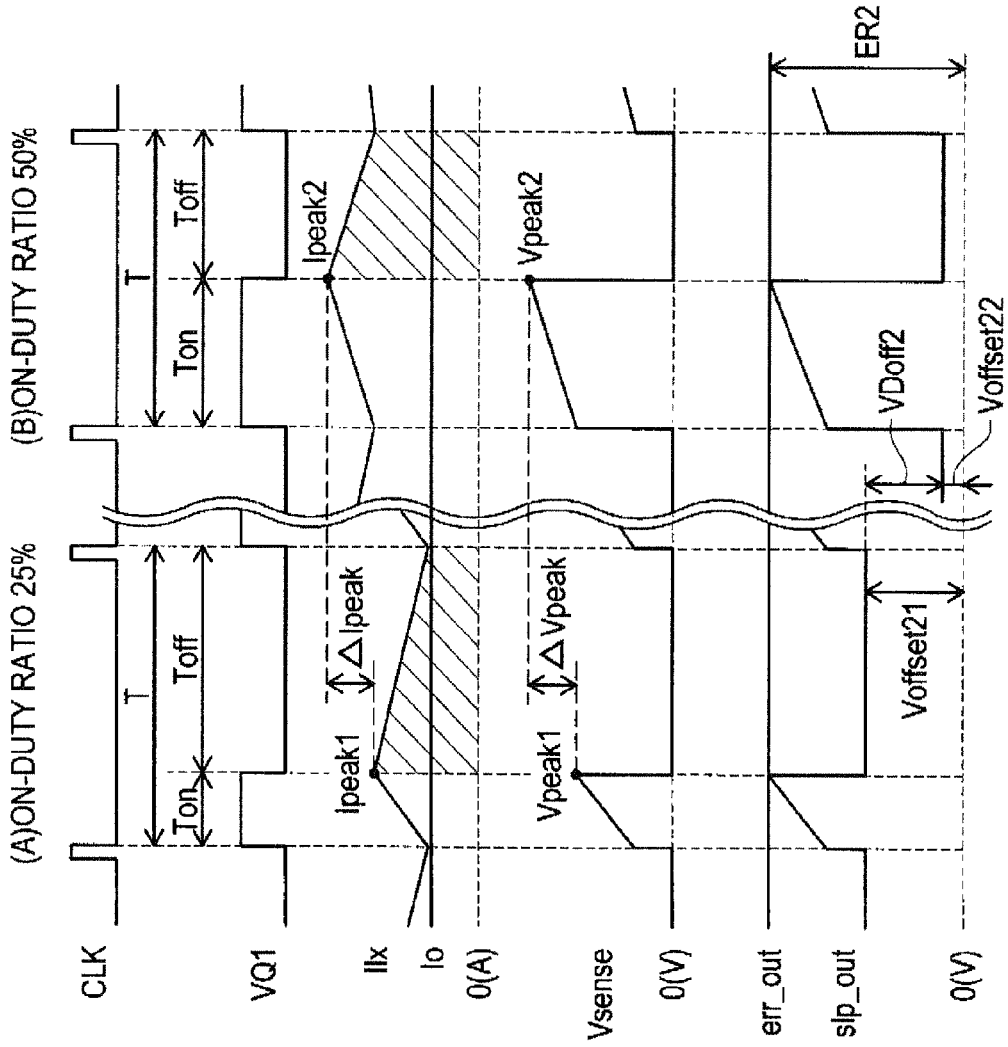

The operation of the step-up DC-DC converter 1a illustrated in FIG. 5 will now be described. First, the operation in the case that the on-duty ratio is smaller than 50% (region R1a in FIG. 6) will be described. A waveform diagram (A) for the case the on-duty ratio is 25% in FIG. 7 and a waveform diagram (B) for the case the on-duty ratio is 50% in FIG. 7 will be described as examples. As slope compensation is not carried out in this region, the offset current Islp is equal to the constant current I1. Also, in this region, the peak value of the coil current waveform Vsense becomes higher as the on-duty ratio becomes larger. Thus, the offset current Ipeak decreases linearly by gradient g2 as the on-duty ratio becomes larger. As a result, the offset current Ioffset2 as well decreases linearly by gradient g2 as the on-duty ratio becomes larger.

The peak value fluctuations in the coil current waveform Vsense will now be described. The peak value of the coil current Ilx increases from the peak value Ipeak1 to Ipeak2 in accordance with an increase in the on-duty ratio from 25% to 50%. This fluctuation in the peak value is generated based on the principle of the step-up DC-DC converter. Specifically, in the step-up DC-DC converter, the energy of the area of shaded region is discharged to the output terminal Tout during an OFF period Toff. Since the OFF period Toff becomes smaller as the on-duty ratio becomes larger, the peak value is raised to maintain the energy amount (area of the shaded region) to be discharged to the output terminal Tout.

The peak value of the coil current waveform Vsense is also raised from the peak value Vpeak1 to Vpeak2 following the fluctuations in the peak value of the coil current Ilx. Here, the peak difference ΔVpeak is expressed by the following formula (14).

$$\Delta Vpeak = |Vpeak2 - Vpeak1| \quad \text{(formula (14))}$$

Next, the control of the offset voltage will be described. As illustrated in the region R1a in FIG. 6, the offset current Ioffset2 decreases linearly as the on-duty ratio becomes larger. Here, the offset current and the offset voltage in case the on-duty ratio is 25% are respectively equal to the offset current Ioffset21 and the offset voltage Voffset21. The offset current and the offset voltage in case the on-duty ratio is 50% are respectively equal to the offset current Ioffset22 and the offset voltage Voffset22. Thus, the decrease amount VDoff2 of the offset voltage (FIG. 7) in case the on-duty ratio increases from 25% to 50% is expressed as illustrated in the following formula (15) using the formula (8).

$$VDoff2 = Ioffset22 \times Rs2 - Ioffset21 \times Rs2 = Voffset22 - Voffset21 = Vpeak2 - Vpeak1 \quad \text{(formula (15))}$$

As was described earlier, when the on-duty ratio is 50% or smaller, the offset voltage is controlled so that the value of the offset voltage Voffset22 is decreased by the decrease amount VDoff2 (formula (15)) in response to the peak value of the coil current waveform Vsense being increased by the amount of the peak difference ΔV peak (formula (14)). It can be understood from formula (14) and formula (15) that since the peak difference ΔV peak and the decrease amount VDoff2 are equal, the influence of the peak difference ΔVpeak is offset by the decrease amount VDoff2. Specifically, in a range wherein the on-duty ratio is 50% or smaller, the value of the offset voltage is controlled so as to correct the current changes in the coil current waveform which are generated based on the principle of the step-up DC-DC converter. As a result, the value of the output signal err_out can be maintained at a constant value ER2.

Slope compensation is carried out in a range wherein the on-duty ratio is larger than 50% (region R2a in FIG. 6). Thus, the peak value of the coil current waveform Vsense increases based on the principle of the step-up DC-DC converter and also increases based on the slope compensation, as the on-duty ratio increases. In this region, the offset current Ioffset2 has gradient g4 which is obtained by adding a decrease gradient g3 corresponding to the increase in the on-duty ratio of the offset current Islp to the decrease gradient g2 corresponding to the increase in the on-duty ratio of the offset current Ipeak. The value of the offset voltage Voffset2 can be controlled so as to correct the current changes in the coil current waveform due to slope compensation, in addition to correcting the current changes which occur in the coil current waveform based on the principle of the step-up DC-DC converter. As the correction operation of the current changes in the coil current waveform due to slope compensation is similar with that in the first embodiment, further detailed description thereof is hereby omitted.

As was described earlier, in the step-up DC-DC converter 1a according to the second embodiment, the offset voltage Voffset2 can moderate the influence of the changes in the peak value of the coil current waveform which occur based on the principle of the step-up DC-DC converter and the changes in the peak value of the coil current waveform which occur in the slope compensation circuit SC. Thus, the level of the output signal err_out can be maintained at a constant value ER2 irrespective of the on-duty ratio. Accordingly, fluctuations in the output voltage Vout can be prevented from occurring. Also, it is possible to prevent changes in the load level with a threshold vale at which the step-up DC-DC converter 1a is switched between an operating state and a non-operating state.

Figure 8:
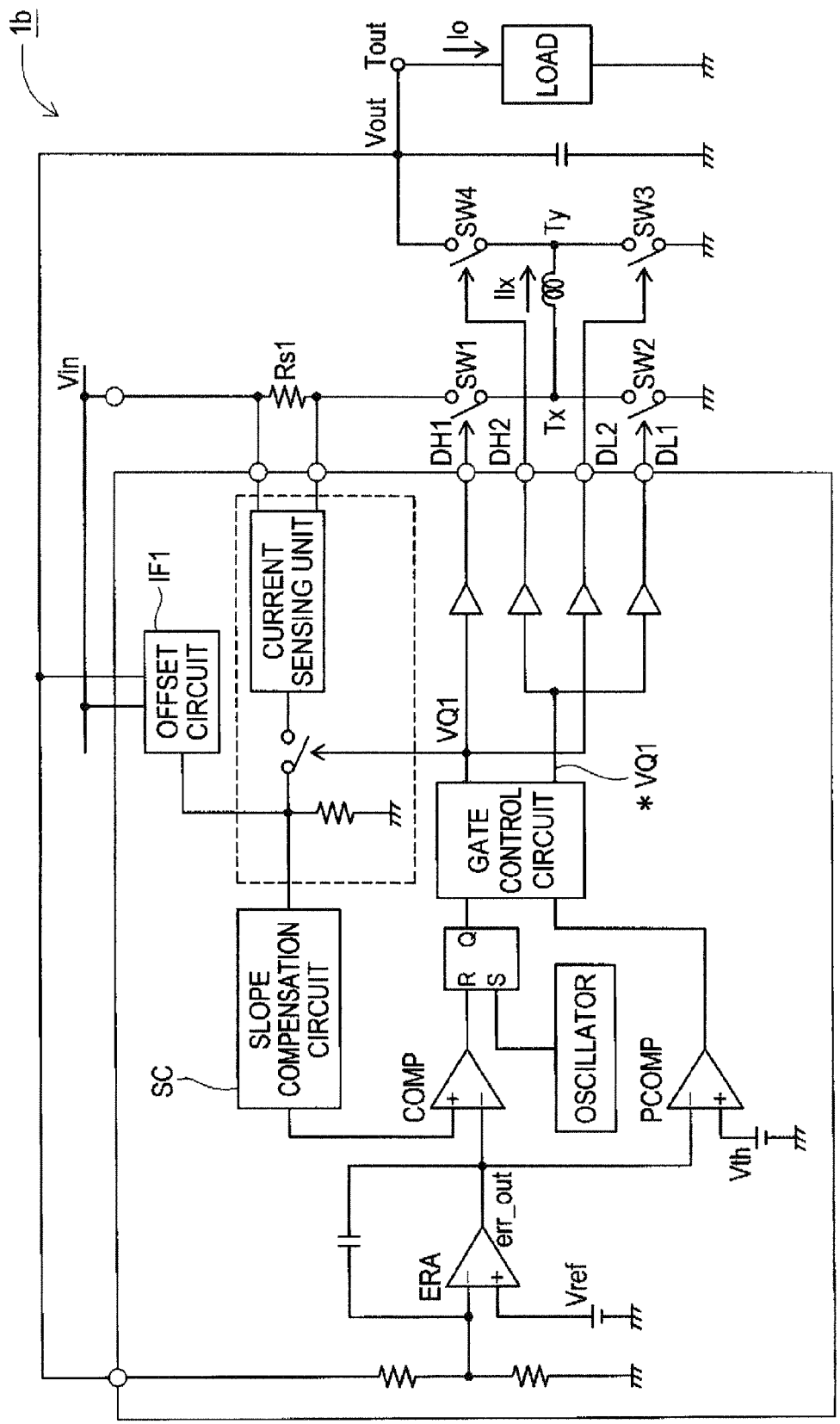
FIG. 8 is a circuit diagram of a step-up/step-down DC-DC converter 1b according to a third embodiment.

A circuit diagram of a step-up/step-down DC-DC converter 1b according to a third embodiment will be illustrated in FIG. 8. The step-up/step-down DC-DC converter 1b has a so-called H-bridge-type switching regulator configuration. This DC-DC converter 1b has a choke coil L1, switches SW1 through SW4, an output capacitor C1 and a control circuit 11. The step-up/step-down DC-DC converter 1b serves to change the peak current value in principle in accordance with a change in the on-duty ratio, similarly with the step-up DC-DC converter 1a in the second embodiment.

One terminal of the switch SW4 is connected to an output terminal Tout. The other terminal of the switch SW4 is connected to terminal Ty of the choke coil L1 and to one terminal of the switch SW3. The other terminal of the switch SW3 is connected to a reference potential. Control terminals of switches SW3 and SW4 are respectively connected to output terminals DL2 and DH2 of the control circuit 11. The rest of the configuration is the same as the step-down DC-DC converter 1 according to the first embodiment, and therefore, further detailed description thereof is hereby omitted.

Figure 9:
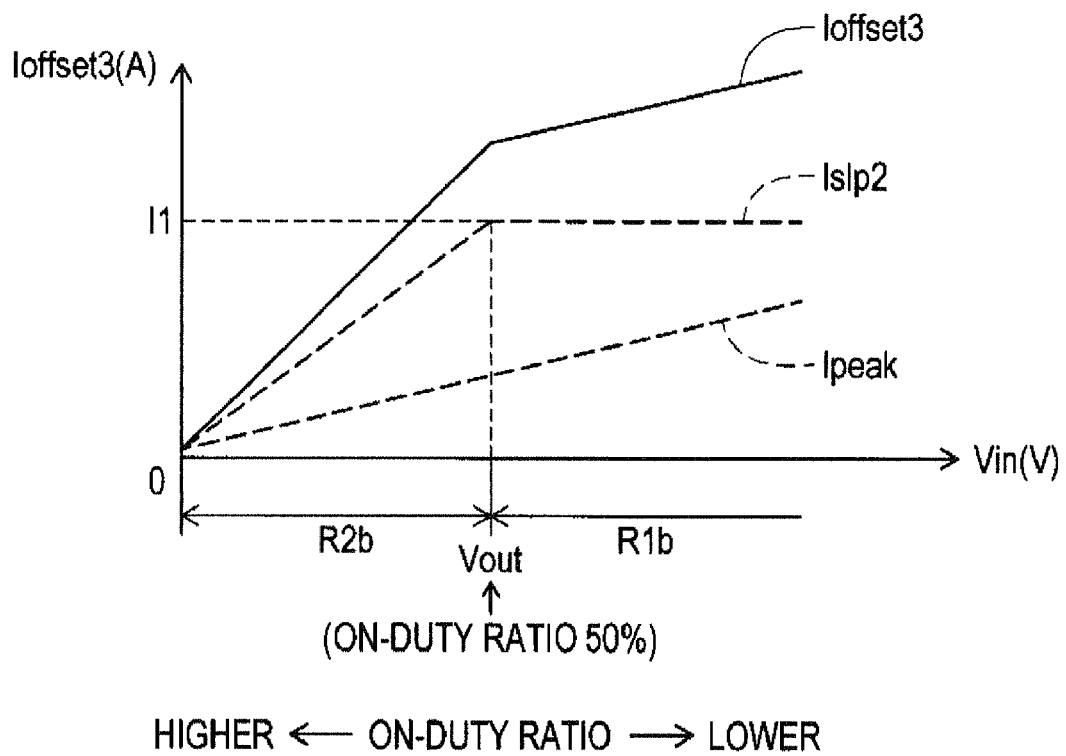
FIG. 9 is a characteristics diagram of an offset current Ioffset3 according to one embodiment of the step-up/step-down DC-DC converter 1b.

The operation in such converter will now be described. First, the operation of the offset circuit IF1 will be described. FIG. 9 is a diagram illustrating the correlation between an input voltage Vin and an offset voltage Ioffset3 in the step-up/step-down DC-Dc converter 1b. When Vin>Vout (region R1b in FIG. 9), the on-duty ratio becomes smaller than 50%, and when Vin<Vout (region R2b in FIG. 9), the on-duty ratio is larger than 50%.

Here, the offset current Ioffset3 is expressed in the following formula (16).

$$I\text{offset3}=I\text{peak}+I\text{slp}2 \quad \text{(formula (16))}$$

The offset current Ioffset3 is the sum of the offset current Ipeak (dotted line in FIG. 9) and the offset current Islp2 (dotted line in FIG. 9).

Here, the offset current Ipeak is determined through formulas (9) and (10) as described earlier. In the step-up/step-down DC-DC converter 1b, the peak value Ipeak1 of the coil current Ilx at the time of the input voltage Vin1 is expressed by the following formula (17).

$$I\text{peak1}=I\text{o}\times(V\text{out}+V\text{in1})/V\text{in1}+V\text{in1}\times V\text{out}T/\{2L\times(V\text{in1}+V\text{out})\} \quad \text{(formula (17))}$$

Similarly, the peak value Ipeak2 of the coil current Ilx at the time of the input voltage Vin2 is expressed by the following formula (18).

$$I\text{peak2}=I\text{o}\times(V\text{out}+V\text{in2})/V\text{in2}+V\text{in2}\times V\text{out}\times T/\{2L\times(V\text{in2}+V\text{out})\} \quad \text{(formula (18))}$$

The offset current Islp2 is expressed by the following formula (19).

$$I\text{slp}2=(T\times V\text{out}\times R\text{sense}/4L)/R\text{s}2-m2\times\{V\text{out}/(V\text{in}+V\text{out})-0.5\}\times T/R\text{s}2 \quad \text{(formula (19))}$$

The rest of the formulas are the same as those for the step-up DC-DC converter 1a according to the second embodiment, and therefore, further detailed description thereof is hereby omitted.

The operation of the step-up/step-down DC-DC converter 1b will now be described. In a period wherein a control signal VQ1 is at a high level and a *VQ1 is at a low level, the switches SW1 and SW3 are in a conductive state, while switches SW2 and SW4 are in a non-conductive state. In a period when the control signal VQ1 is at a low level and the *VQ1 is at a high level, switches SW1 and SW3 are in a non-conductive state, while switches SW2 and SW4 are in a conductive state.

Next, a description will be given of the operation in the step-up/step-down DC-DC converter 1b in a range wherein the on-duty ratio is smaller than 50% (region R1b in FIG. 9). As slope compensation is not carried out in this region, the offset current Islp2 is equal to a constant current I1. The influence generated by fluctuations in the peak value of the coil current waveform Vsense which occur based on the principle of the step-up/step-down DC-DC converter can be moderated by controlling the offset voltage Voffset3 in a manner similar with the case of the step-up DC-DC converter 1a according to the second embodiment.

Slope compensation is carried out in a range wherein the on-duty ratio is larger than 50% (region R2b in FIG. 9). Here, as is the case with the step-up DC-DC converter 1a according to the second embodiment, the value of the offset voltage Voffset3 is controlled so as to correct the current changes in the coil current waveform due to slope compensation, in addition to correcting the current changes in the coil current waveform which occur based on the principle of the step-up/step-down DC-DC converter. As the operation of this converter is the same as that of the step-up DC-DC converter 1a according to the second embodiment, a detailed description thereof is hereby omitted.

As was described earlier, in the step-up/step-down DC-DC converter 1b according to the third embodiment as well, the value of the output signal err_out can be maintained at a constant value, irrespective of the on-duty ratio. Thus, fluctuations can be prevented from occurring in the output voltage Vout. Also, it is possible to prevent changes in the load level with a threshold value at which the step-up DC-DC converter 1b is switched between an operating state and a non-operating state.

The present invention is not limited to the above-described embodiments, but various improvements and modifications can be made thereto without departing from the spirit of the present invention. The DC-DC converters described in the present embodiments can surely be applied to various types of systems. For instance, these types of DC-DC converters may be mounted in a portable device system 20, as illustrated in FIG. 10. Such portable device system 20 may include personal computers, cell phones, game consoles, digital cameras and the like. An input voltage Vin is supplied from an AC adapter 21a or a lithium ion battery 22 to the DC-DC converter 1. Here, the AC adapter 21a may include a power source (power source which carries DC conversion and voltage conversion with respect to an AC power source) other than converters which are used in lap tops and the like. The lithium ion battery 22 may include batteries (direct current batteries, lithium batteries or the like) for mobile devices such as portable phones and the like. An output voltage Vout is outputted from the DC-DC converter 1 to the load 5. Here, load 5 may include an internal circuit of an electronic device (ASIC 24, memory 25, CPU 26, liquid crystal display device 27 and the like). Of course, this may be applied not only to the DC-DC converter 1, but also to the step-up DC-DC converter 1a and the step-down DC-Dc converter 1b.

In the present embodiment, a description was given concerning the case that the on-duty ratio 50% represents the threshold value for determining whether or not to carry out slope compensation. However, this is not limited to this embodiment alone. To maintain an operating margin, an on-duty ratio of 50% or lower may of course be set as the threshold value. At this time, to ensure that a sufficient output current is obtained, the threshold value is preferably set to an on-duty ratio of 40% or higher.

In the present embodiments, a description was given of the case that the compensation value CV1 and the decrease amount VDoff are equal. However, this is not limited to this embodiment alone. Needless to say, a relationship is possible wherein the influence of increase in the coil current and the influence of the decrease in the offset offset each other. As a result, the level fluctuations in the output signal err_out are moderated.

The control circuit 11 of the present embodiments may also be configured by a single or a plurality of semiconductor chips. The DC-DC converter 1 may be configured by a single or a plurality of semiconductor chips, or otherwise, may also be configured as a module.

In the present embodiment, switches SW2 and SW4 are used as synchronous rectifying elements. However, this is not limited to this embodiment. The rectifying operation may also be carried out using diode elements. For instance, at least either one of the switches SW2 and SW4 can be replaced by a diode, or otherwise, diodes may be provided in parallel with at least either one of the switches SW2 and SW4.

The output signal err_out represents one example of a differential output. Switch SW1 represents one example of a main switching element. Gradient g1 represents one example of a first decrease gradient and gradient g2 represents one example of a second decrease gradient. The comparator COMP represents one example of a first control circuit. The comparator PCOMP and the gate control circuit GC respectively represent one example of a second control circuit.

According to the disclosed control circuit of the DC-DC converter, the DC-DC converter and the control method of the DC-DC converter, it is possible to provide a DC-DC converter capable of generating a stable output voltage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control circuit of a DC-DC converter comprising:
    a differential amplifier configured to output a differential output in accordance with an output voltage to be outputted through a coil and a reference voltage;
    a first control circuit configured to compare the differential output with a coil current flowing to the coil and to determine an ON period in an operating cycle of a main switching element which is included in a current path of the coil current;
    a slope compensation circuit configured to add an increase gradient due to slope compensation to an increase gradient of the coil current in a range wherein the ON period exceeds a certain period of time; and
    an offset circuit configured to apply an offset to the coil current, the offset becoming smaller depending on the ON period in excess of the certain period of time,
    wherein
    the DC-DC converter is a step-down DC-DC converter; and
    the offset circuit decreases the offset by a first increase gradient at which the increase gradient due to slope compensation is equal to an absolute value, in a range wherein the ON period exceeds a certain period of time.

2. The control circuit of the DC-DC converter according to claim 1, further comprising;
    a second control circuit to which the differential output and a threshold value determined in advance are inputted, the second control circuit for halting an operation of the main switching element if the differential output is smaller than the threshold value.

3. The control circuit of the DC-DC converter according to claim 1, wherein the certain period of time is set to a value equal to or more than 40% of the operating cycle.

4. A control circuit of the DC-DC converter comprising:
    a differential amplifier configured to output a differential output in accordance with an output voltage to be outputted through a coil and a reference voltage;
    a first control circuit configured to compare the differential output with a coil current flowing to the coil and to determine an ON period in an operating cycle of a main switching element which is included in a current path of the coil current;
    a slope compensation circuit configured to add an increase gradient due to slope compensation to an increase gradient of the coil current in a range wherein the ON period exceeds a certain period of time; and
    an offset circuit configured to apply an offset to the coil current, the offset becoming smaller depending on the ON period in excess of the certain period of time,
    wherein
    the DC-DC converter is one of a step-up DC-DC converter and a step-up/step-down DC-DC converter; and
    the offset circuit decreases the offset by a second decrease gradient with respect to an increase in the ON period, in a range wherein the ON period does not exceed the certain period of time.

5. The control circuit of the DC-DC converter according to claim 4, wherein
    the offset circuit decreases the offset by a gradient obtained by adding a first decrease gradient at which an increase gradient due to the slope compensation is equal to an absolute value, to the second decrease gradient.

6. A DC-DC converter comprising:
    a differential amplifier configured to output a differential output in accordance with an output voltage to be outputted through a coil and a reference voltage;
    a first control circuit configured to compare the differential output with a coil current flowing to the coil and to determine an ON period in an operating cycle of a main switching element which is included in a current path of the coil current;
    a slope compensation circuit configured to add an increase gradient due to slope compensation to an increase gradient of a coil current waveform in a range wherein the ON period exceeds a certain period of time; and
    an offset circuit configured to apply an offset to the coil current waveform, with the offset becoming smaller depending on the ON period in excess of the certain period of time,
    wherein
    the DC-DC converter is a step-down DC-DC converter; and
    the offset circuit decreases the offset by a first increase gradient at which the increase gradient due to slope compensation is equal to an absolute value, in a range wherein the ON period exceeds a certain period of time.

7. The DC-DC converter according to claim 6, further comprising;
a second control circuit to which the differential output and a threshold value determined in advance are inputted, the second control circuit for halting operation of the main switching element if the differential output is smaller than the threshold value.

8. A control method of a DC-DC converter, comprising:
outputting a differential output in accordance with an output voltage to be outputted through a coil and a reference voltage and comparing the differential output with a coil current flowing to the coil and determining an ON period in an operating cycle of a main switching element which is included in a current path of the coil current;
adding an increase gradient due to slope compensation to an increase gradient of a coil current waveform in a range wherein the ON period exceeds a certain period of time; and
applying an offset to the coil current waveform, with the offset becoming smaller depending on the ON period in excess of the certain period of time,
wherein
the DC-DC converter is a step-down DC-DC converter; and
the applying the offset decreases the offset by a first increase gradient at which the increase gradient due to slope compensation is equal to an absolute value, in a range wherein the ON period exceeds a certain period of time.

9. The control method of the DC-DC converter according to claim 8, further comprising an operation wherein the differential output and a threshold value determined in advance are inputted, the operation to halt an operation of the main switching element if the differential output is smaller than the threshold value.

* * * * *